(12) United States Patent
Lin et al.

(10) Patent No.: US 11,146,921 B2
(45) Date of Patent: Oct. 12, 2021

(54) METHOD OF GROUPING USER DEVICES

(71) Applicant: INDUSTRIAL TECHNOLOGY RESEARCH INSTITUTE, Hsinchu (TW)

(72) Inventors: You-En Lin, Taichung (TW); Jen-Feng Huang, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/234,173

(22) Filed: Dec. 27, 2018

(65) Prior Publication Data

US 2020/0213817 A1    Jul. 2, 2020

(51) Int. Cl.
*H04W 4/08* (2009.01)

(52) U.S. Cl.
CPC .................................. *H04W 4/08* (2013.01)

(58) Field of Classification Search
CPC .... H04W 4/08; H04W 72/042; H04L 1/1861; H04L 5/0044; H04L 5/0055; H04L 5/0057; H04L 5/0092
USPC ................................................. 455/518–521
See application file for complete search history.

(56) References Cited

U.S. PATENT DOCUMENTS

| 8,023,457 B2 | 9/2011 | Kotecha et al. |
| 8,233,848 B2 | 7/2012 | Zhang et al. |
| 8,565,688 B2 | 10/2013 | Li et al. |
| 8,583,161 B2 | 11/2013 | Li et al. |
| 9,077,411 B2 | 7/2015 | Kotecha et al. |
| 2007/0110000 A1* | 5/2007 | Abedi ............... H04L 47/522 370/332 |
| 2008/0043874 A1 | 2/2008 | Lee et al. |
| 2011/0019637 A1 | 1/2011 | Ojala et al. |

(Continued)

FOREIGN PATENT DOCUMENTS

| CN | 1853385 B | 10/2006 |
| CN | 103716883 B | 5/2017 |

(Continued)

OTHER PUBLICATIONS

TW Office Action in application No. 107147450 dated Sep. 9, 2019.

(Continued)

*Primary Examiner* — Yuwen Pan
*Assistant Examiner* — Angelica M Perez
(74) *Attorney, Agent, or Firm* — Maschoff Brennan

(57) ABSTRACT

A grouping method of user devices comprises configuring one or more codes for each of the user devices by a base station wherein each of said one or more codes corresponds to a delay tolerance, performing a grouping task by the base station according to the delay tolerances and a determining result of channel-usage demand corresponding to each of the user devices so as to form one or more first-type groups and one or more second-type groups wherein each first-type group corresponds to a first-group delay tolerance and each second-type group corresponds to a second-group delay tolerance, and performing a selection from user devices in the first-type groups and the second-type groups to form one or more target groups by the base station according to the first-group delay tolerances and the second-group delay tolerances.

10 Claims, 10 Drawing Sheets

(56) References Cited

U.S. PATENT DOCUMENTS

| | | | |
|---|---|---|---|
| 2013/0339438 A1* | 12/2013 | Cherian | H04W 4/08 |
| | | | 709/204 |
| 2016/0329940 A1 | 11/2016 | Wang et al. | |
| 2017/0118794 A1 | 4/2017 | Lee et al. | |
| 2017/0208612 A1* | 7/2017 | Tushar | H04W 72/14 |
| 2018/0241533 A1 | 8/2018 | Loehr et al. | |

FOREIGN PATENT DOCUMENTS

| | | |
|---|---|---|
| TW | I445430 B | 7/2014 |
| TW | I623238 B | 5/2018 |
| WO | 2011138777 A3 | 1/2012 |

OTHER PUBLICATIONS

"Ericsson Mobility Visualizer", Ericsson, Nov. 2018 Retrieved From:https://www.ericsson.com/en/mobility-report/mobility-visualizer?f=7&ft=2&r=1&t=1,20&s=4&u=3&y=2017,2023&c=3.

Gesbert, David, and M-S. Alouini. "How much feedback is multi-user diversity really worth?." Communications, 2004 IEEE International Conference on. vol. 1. IEEE, 2004.

Hassel, Vegard, et al. "Exploiting multiuser diversity using multiple feedback thresholds." Vehicular Technology Conference, 2005. VTC 2005-Spring. 2005 IEEE 61st. vol. 2. IEEE, 2005.

Li, Jin-Hao, and Hsuan-Jung Su. "Opportunistic feedback reduction for multiuser MIMO broadcast channel with orthogonal beamforming," IEEE Transactions on Wireless Communications13.3 (2014): 1321-1333.

Pugh, Matthew, and Bhaskar D. Rao. "Reduced feedback schemes using random beamforming in MIMO broadcast channels." IEEE Transactions on Signal Processing 58.3 (2010): 1821-1832.

Sharif, Masoud, and Babak Hassibi. "On the capacity of MIMO broadcast channels with partial side information." IEEE Transactions on information Theory 51.2 (2005): 506-522.

Zakhour, Randa, and David Gesbert. "A two-stage approach to feedback design in multi-user MIMO channels with limited channel state information." Personal, Indoor and Mobile Radio Communications, 2007. PIMRC 2007. IEEE 18th International Symposium on. IEEE, 2007.

* cited by examiner

METHOD OF GROUPING USER DEVICES

BACKGROUND

1. Technical Field

This invention relates to a grouping method of user devices.

2. Related Art

In the field of long term evolution (LTE) network, for improving the spectrum usage efficiency and providing the better service quality for the user end, the network end usually has to measure and report wireless channels. The base station can allocate the related parameters of user devices, so as to improve the usage efficiency of channel resources.

In general, a base station is connected with multiple user devices, and the parameter characteristics, such as delay tolerance, of these user devices may vary. When the number of the user devices is large, the base station cannot easily configure the parameters of these user devices for improving the usage efficiency of channel resources due to the differences in the parameter characteristics.

SUMMARY

According to an embodiment of this invention, a grouping method of user devices comprises configuring one or more codes for each of the user devices by a base station, wherein each of said one or more codes corresponds to a delay tolerance; performing a grouping task by the base station according to the delay tolerances and a determining result of channel-usage demand corresponding to each of the user devices so as to form one or more first-type groups and one or more second-type groups, wherein each first-type group corresponds to a first-group delay tolerance and each second-type group corresponds to a second-group delay tolerance; and performing a selection from user devices in the first-type groups and the second-type groups to form one or more target groups by the base station according to the first-group delay tolerances and the second-group delay tolerances.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
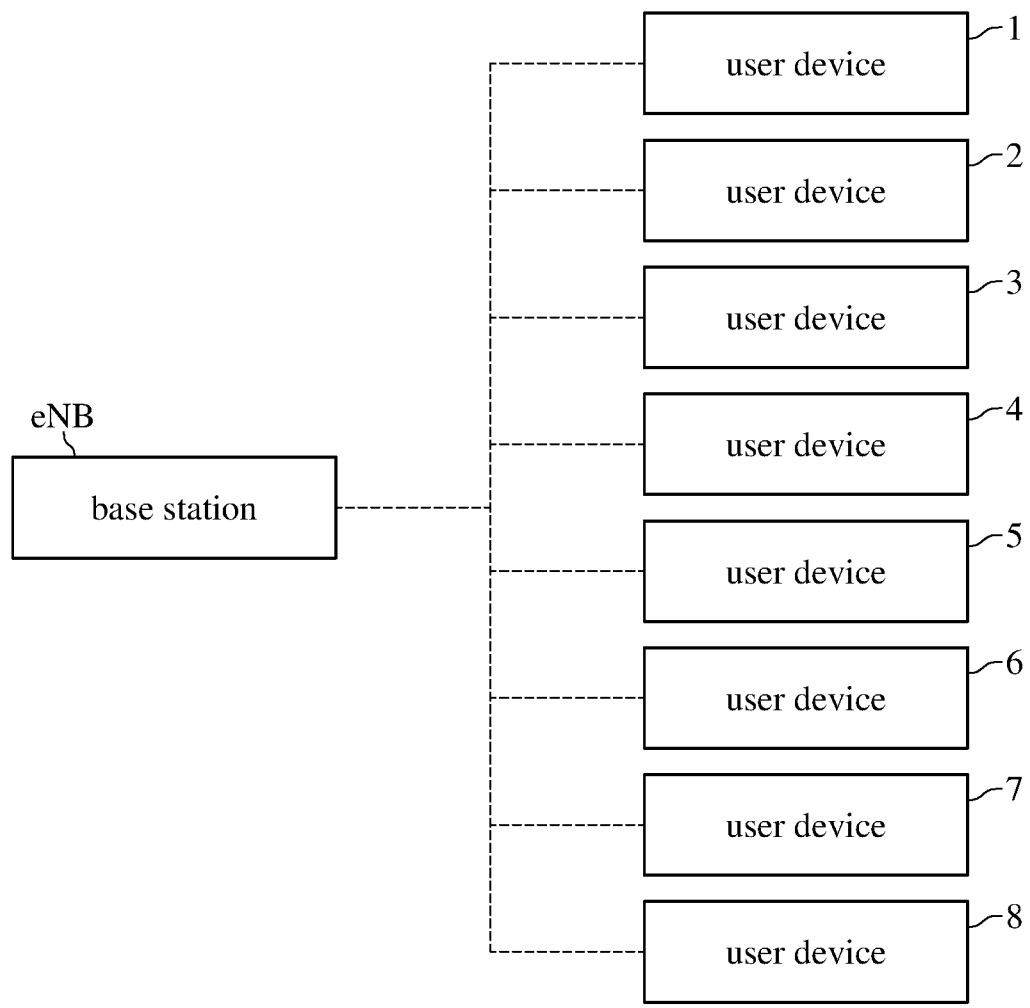
FIG. 1 is a block diagram of long term evolution network architecture according to an embodiment of this invention.
Figure 2:
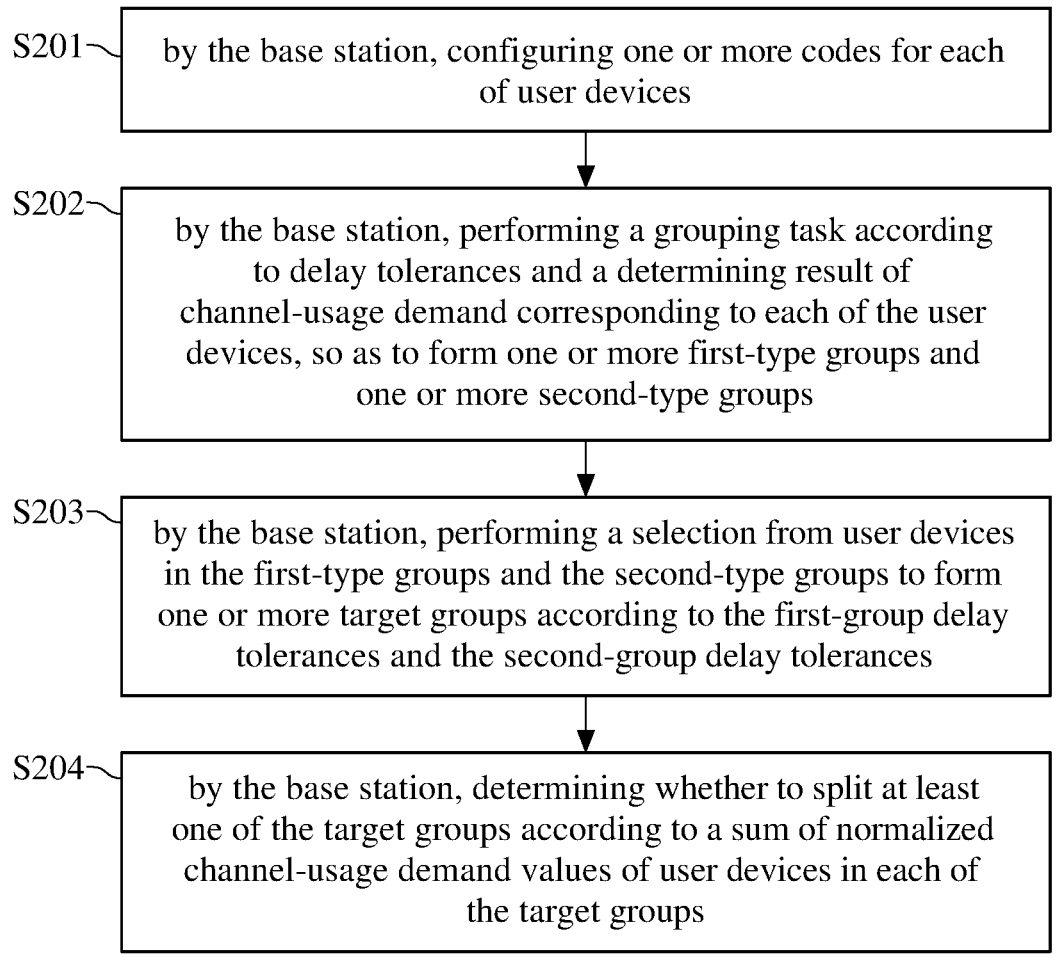
FIG. 2 is a flow chart of a grouping method of user devices according to an embodiment of this invention.

Please refer to FIG. 1 and FIG. 2, wherein FIG. 1 is a block diagram of long term evolution network architecture according to an embodiment of this invention, and FIG. 2 is a flow chart of a grouping method of user devices according to an embodiment of this invention. As shown in FIG. 1, the long term evolution network architecture comprises a base station eNB and user devices 1-8. The base station eNB has communication connections with the user device 1-8. In practice, the base station eNB is provided with a radio resource control (RRC) layer and a media access control (MAC) layer, and the base station eNB can have a scheduler disposed at the media access control (MAC) layer. The radio resource control (RRC) layer of the base station eNB can be configured to set the channel-state information (CSI) report parameter, the discontinuous reception (DRX) parameter and so on of the user devices.

As shown in the procedure of the grouping method in Fig., in step S201, the base station eNB configures one or more codes of each of the user devices 1-8, wherein each code corresponds to a delay tolerance. In step S202, the base station eNB performs a grouping task according to the delay tolerances and a determining result of channel-usage demand corresponding to each of the user devices, so as to form one or more first-type groups and one or more second-type groups, wherein each first-type group corresponds to a first-group delay tolerance and each second-type group corresponds to a second-group delay tolerance.

In an embodiment, said step S201 comprises configuring said one or more codes of the user devices according to the service type of each of the user devices. The service type can be voice/video transmission, interactive games, mail/community communication, file sharing, etc., and are not enumerated one by one herein.

In step S203, the base station eNB performs a selection from the user devices in the first-type groups and the second-type groups to form one or more target groups according to the first-group delay tolerances and the second-group delay tolerances.

In an embodiment, the grouping method of this invention further comprises step S204, wherein the base station eNB determines whether to split at least one of the target groups according to the sum of channel-usage demand values of the user devices in each target group.

Figure 3:
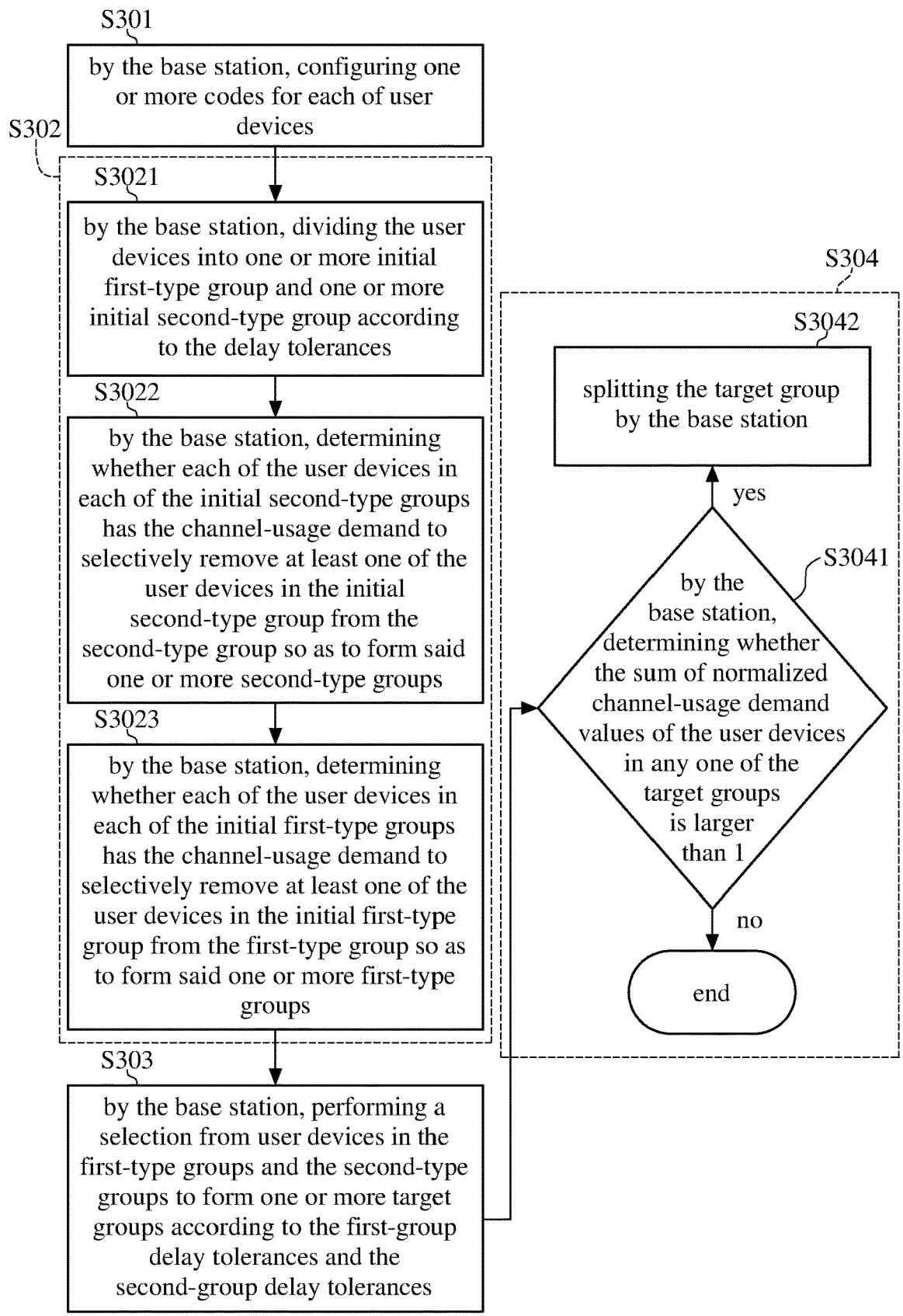
FIG. 3 is a detailed flow chart of a grouping method of user devices according to another embodiment of this invention.

For the further explanation of the grouping method of this invention, please refer to FIG. 3 and Table 1, wherein FIG. 3 is a detailed flow chart of a grouping method of user devices according to another embodiment of this invention, and Table 1 is a lookup table according to an embodiment of this invention. In the delay tolerance Dp,i described in the following example, p represents a code, and i represents the number of a user device (such as number 1-8 in FIG. 1). The procedure of steps S301-S304 in FIG. 3 is approximately similar to that of steps S201-204 in FIG. 2, except that step S302 in FIG. 3 comprises sub-steps S3021-3023 and step S304 comprises sub-steps S3041-3042.

As shown in FIG. 3, firstly in step S301, the base station eNB configures one or more codes for each of user device 1-8, such as codes 1-9 as shown in Table 1, and each of the codes corresponds to a delay tolerance.

In sub-step S3021 of step S302, the base station eNB divides the user devices into one or more initial first-type groups and one or more initial second-type groups according to the delay tolerances. In an embodiment, the sub-step S3021 comprises by the base station eNB, selecting the user devices having the identical minimum delay tolerance from the user device 1-8 to form said one or more initial first-type groups, and by the base station eNB, selecting the user devices having the identical maximum delay tolerance from the user device 1-8 to form said one or more initial second-type groups. A practical example is illustrated in the following.

TABLE 1

| Code | Delay tolerance (ms) | Service type |
|------|---------------------|--------------|
| 2    | 100                 | TP1          |
| 4    | 150                 | TP2          |
| 3    | 50                  | TP3          |
| 5    | 300                 | TP4          |
| 1    | 100                 | TP5          |
| 6    | 300                 | TP6          |
| 7    | 100                 | TP7          |
| 8    | 300                 | TP8          |
| 9    | 300                 | TP9          |

In this example, user device 1 providing service types TP1, TP2, TP6 has delay tolerance $D_{2,1}$ which is 100 ms, delay tolerance $D_{4,1}$ which is 150 ms and delay tolerance $D_{6,1}$ which is 300 ms. The user device 2 providing service types TP2, TP3, TP7 has delay tolerance $D_{4,2}$ which is 150 ms, delay tolerance $D_{3,2}$ which is 50 ms and delay tolerance $D_{7,2}$ which is 100 ms. The user device 3 providing service types TP2, TP8 has delay tolerance $D_{4,3}$ which is 150 ms and delay tolerance $D_{8,3}$ which is 300 ms. The user device 4 providing service types TP1, TP2, TP9 has delay tolerance $D_{2,4}$ which is 100 ms, delay tolerance $D_{4,4}$ which is 150 ms and delay tolerance $D_{9,4}$ which is 300 ms. The user device 5 providing service types TP2, TP3 has delay tolerance $D_{4,5}$ which is 150 ms and delay tolerance $D_{3,5}$ which is 50 ms. The user device 6 providing service types TP3, TP7 has delay tolerance $D_{3,6}$ which is 50 ms and delay tolerance $D_{7,5}$ which is 100 ms. The user device 7 providing service types TP3, TP5 has delay tolerance $D_{3,7}$ which is 50 ms and delay tolerance $D_{1,7}$ which is 100 ms. The user device 8 providing service types TP2, TP3 has delay tolerance $D_{4,8}$ which is 150 ms and delay tolerance $D_{3,8}$ which is 50 ms.

Figure 4:
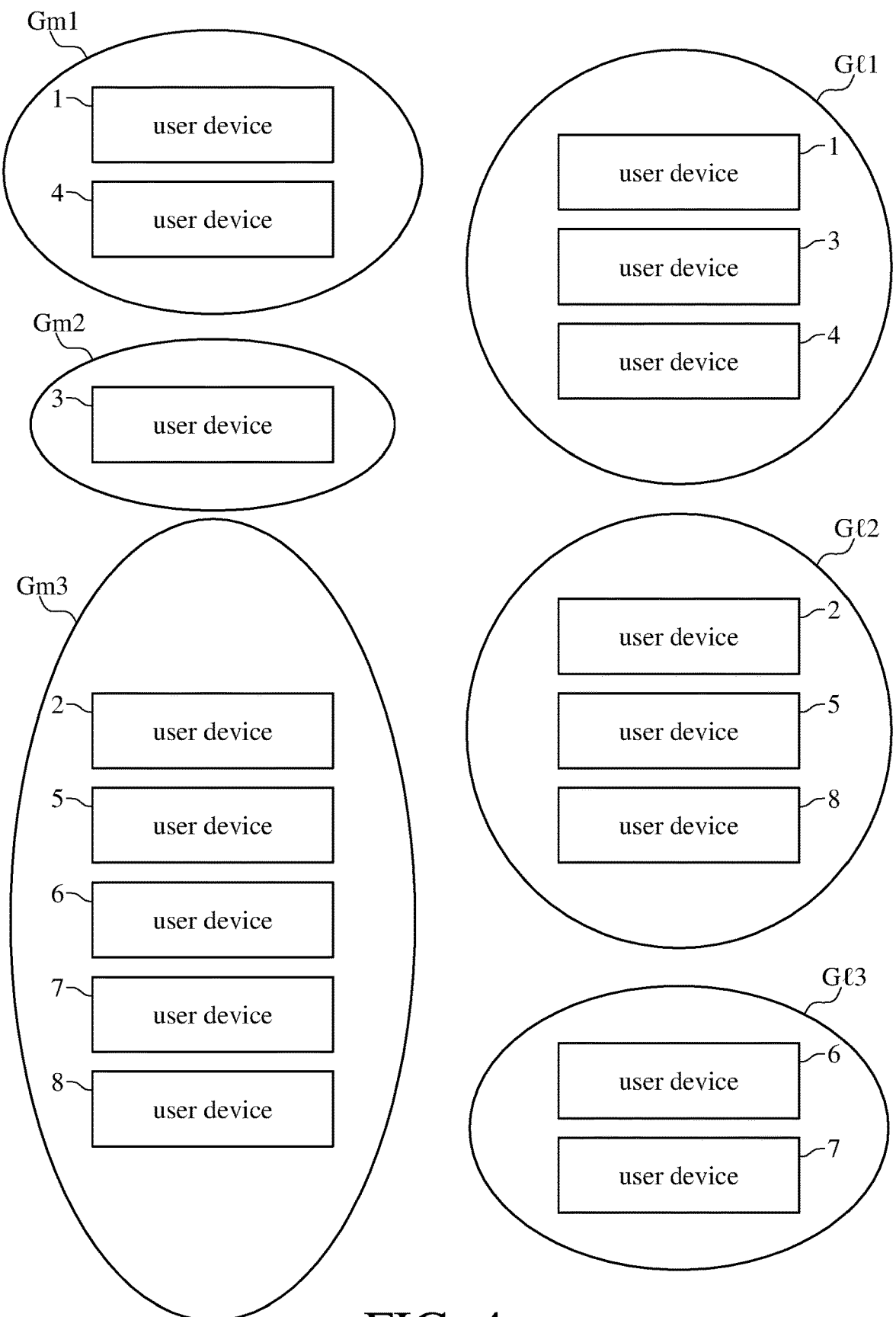
FIG. 4 is a schematic diagram of initial grouping according to an embodiment of this invention.

Please further refer to Table 2 and FIG. 4, wherein Table. 2 is a classification table of delay tolerances of user devices according to an embodiment of this invention, and FIG. 4 is a schematic diagram of initial grouping according to an embodiment of this invention. Based on the aforementioned example, as shown in Table 2 and FIG. 4, the user devices 1, 4 have the identical minimum delay tolerance 100 ms, so that the base station eNB classified the user devices 1, 4 as an initial first-type group Gm1. The user device 3 having the minimum delay tolerance 150 ms is individually classified as another initial first-type group Gm2 by the base station eNB. The user device 2, 5, 6, 7, 8 have the identical minimum delay tolerance 50 ms, so that the base station eNB classifies the user devices 2, 5, 6, 7, 8 as yet another initial first-type group Gm3. In this embodiments, the first-group delay tolerance corresponding to the initial first-type group Gm1 is 100 ms, the first-group delay tolerance corresponding to the initial first-type group Gm2 is 150 ms, and the first-group delay tolerance corresponding to the initial first-type group Gm3 is 50 ms.

On the other hand, the user devices 1, 3, 4 have the identical maximum delay tolerance 300 ms, so that the base station eNB classifies the user devices 1, 3, 4 as an initial second-type group Gl1. The user devices 2, 5, 8 have the identical maximum delay tolerance 150 ms, so that the base station eNB classifies the user devices 2, 5, 8 as another initial second-type group Gl2. The user devices 6, 7 have the identical maximum delay tolerance 100 ms, so that the base station eNB classifies the user devices 6, 7 as yet another initial second-type group Gl3. In this embodiments, the second-group delay tolerance corresponding to the initial second-type group Gl1 is 300 ms, the second-group delay tolerance corresponding to the initial second-type group Gl2 is 150 ms, and the second-group delay tolerance corresponding to the initial second-type group Gl3 is 100 ms.

TABLE 2

| User device 1 | 300 ms, 150 ms, 100 ms |
| User device 2 | 150 ms, 100 ms, 50 ms |
| User device 3 | 300 ms, 150 ms |
| User device 4 | 300 ms, 150 ms, 100 ms |
| User device 5 | 150 ms, 50 ms |
| User device 6 | 100 ms, 50 ms |
| User device 7 | 100 ms, 50 ms |
| User device 8 | 150 ms, 50 ms |

In step S3022, the base station eNB determines whether each of the user devices in each of the initial second-type groups has the channel-usage demand (traffic demand) to selectively remove at least one of the user devices from this initial second-type group, so as to form one or more second-type groups. In an embodiment, said step S3022 comprises when the base station eNB determines that at least one of the user devices in one of the initial second-type groups has the channel-usage demand, removing this user device from this initial second-type group by the base station eNB, so as to form one or more second-type groups.

In step S3023, the base station eNB determines whether each of the user devices in each of the initial first-type groups has the channel-usage demand to selectively remove at least one of the user devices from this initial first-type group, so as to form one or more first-type groups. In an embodiment, said step S204 comprises when the base station eNB determines that at least one of the user devices in one of the initial first-type groups does not have the channel-usage demand, removing this user device from this initial second-type group by the base station eNB, so as to form one or more second-type groups.

More particularly, the code of a user device corresponds to a normalized channel-usage demand. When a user device has a normalized channel-usage demand Rp,i, wherein p represents a code, and i represents the number of the user device (such as number 1-8 in FIG. 1), in practice, the method of determining whether the user device has the channel-usage demand is as follows: when $\Sigma_{p=1}^{p=P} R_{p,i} > 0$, the user device has the channel-usage demand. On the contrary, when $\Sigma_{p=1}^{p=P} R_{p,i} = 0$, the user device does not have the channel-usage demand.

Based on the aforementioned examples, when the user devices 1, 3, 5, 7 have the channel-usage demand, and the other user devices 2, 4, 6, 8 does not have channel-usage demand. At this moment, the base station eNB makes the user devices 1, 3 in the initial second-type group Gl1 be removed from the initial second-type group Gl1, makes the user device 5 in the initial second-type group Gl2 be removed from the initial second-type group Gl2, and makes the user device 7 in the initial second-type group Gl3 be removed from the initial second-type group Gl3. On the other hand, the base station eNB makes the user device 4 in the initial first-type group Gm1 be removed from the initial first-type group Gm1, and makes the user devices 2, 6, 8 in the initial first-type group Gm3 be removed from the initial first-type group Gm3.

In the aforementioned embodiments, the base station eNB performs the initial grouping according to the maximum delay tolerances and the minimum delay tolerances of the user devices, and then determines whether each of the user devices has channel-usage demand to remove part of the user devices one by one. In another embodiment, the base station eNB can firstly determine whether each of the user devices has the channel-usage demand, and then perform the grouping according to the maximum delay tolerances and the minimum delay tolerances of the user devices and remove part of the user devices according to the determining result of the channel-usage demand. In other words, this invention is not limited to the order of the maximum and minimum delay tolerance grouping step and the channel-usage demand determining step shown in step S302 of FIG. 3.

Figure 5:
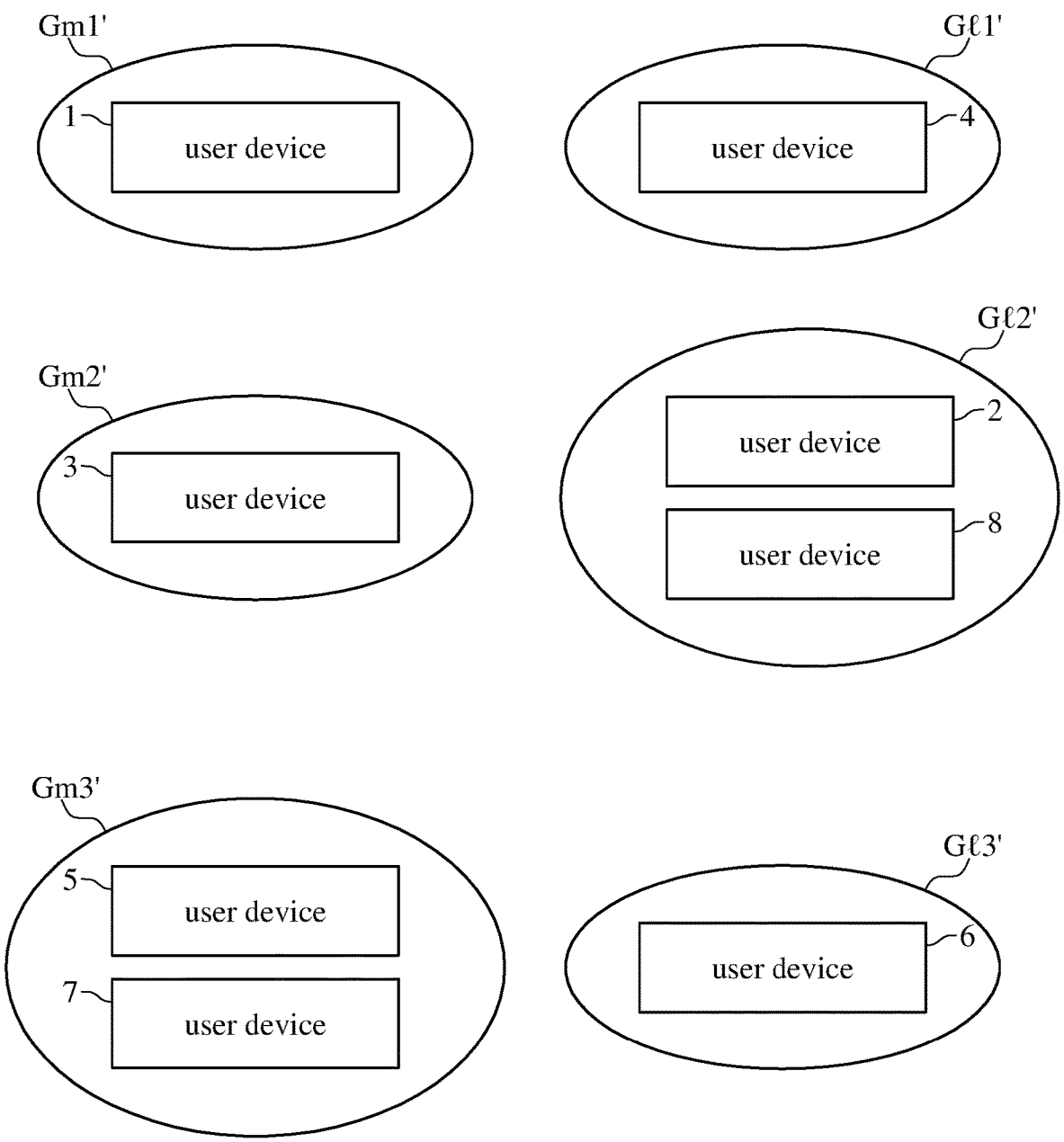
FIG. 5 is a schematic diagram of grouping according to an embodiment of this invention.

Please further refer to FIG. 5, wherein FIG. 5 is a schematic diagram of grouping according to an embodiment of this invention. After removing the specific user device according to the channel-usage demand by the base station eNB as aforementioned, the obtained grouping state of the user devices as shown in FIG. 5. In other words, after performing the aforementioned grouping task, the first-type groups Gm1'-Gm3' and the second-type groups Gl1'-Gl3' can be formed finally as shown in FIG. 5. Afterwards, the base station eNB can further form one or more target groups according to this grouping state.

More specifically, as shown in step S303, the base station eNB performs a selection from the user devices in the first-type groups and the second-type groups to form one or more target groups according to the first-group delay tolerances and the second-group delay tolerances. In an embodiment, said step S303 comprises when the base station eNB determines that one of the first-group delay tolerances is identical to one of the second-group delay tolerances, selecting the user devices in the first-type group corresponding to this first-group delay tolerance and the user devices in the second-type group corresponding to this second-group delay tolerance to form said target group.

Figure 6:
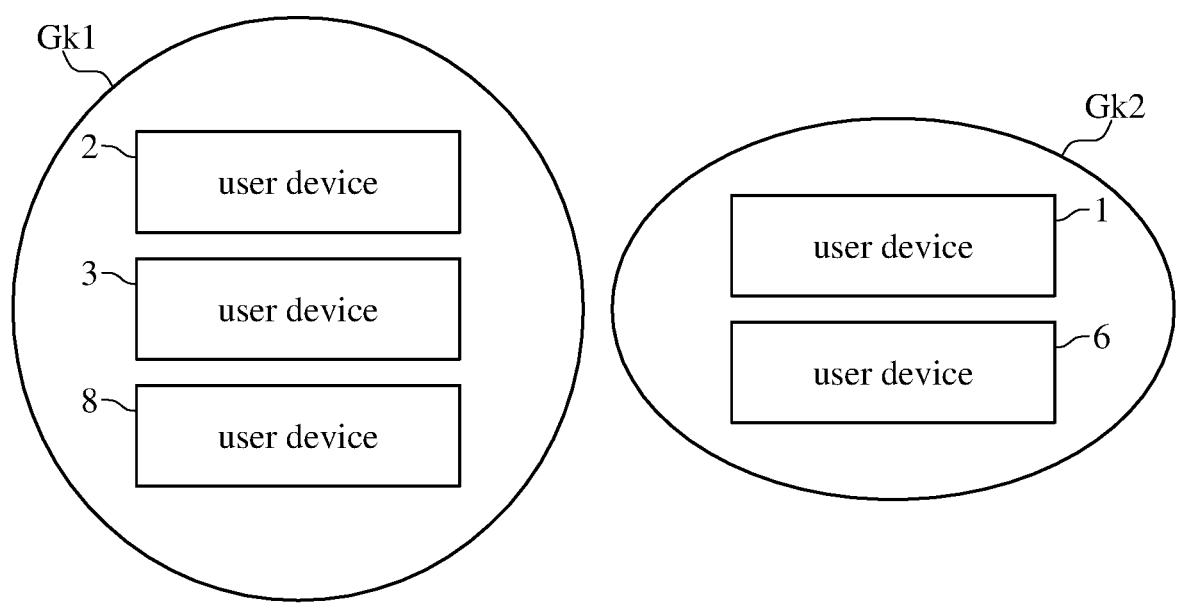
FIG. 6 is a schematic diagram of target groups according to an embodiment of this invention.

More particularly, please further refer to FIG. 6, wherein FIG. 6 is a schematic diagram of target groups according to an embodiment of this invention. In FIG. 5, since the second-group delay tolerance corresponding to the second-type group Gl2' is 150 ms, and the first-group delay tolerance corresponding to the first-type group Gm2' is also 150 ms, the base station eNB can select the user devices 2, 8 from the second-type group Gl2' and the user device 3 from the first-type group Gm2' to form a target group Gk1, as shown in FIG. 5. On the other hand, since the second-group delay tolerance corresponding to the second-type group Gl3' is 100 ms, and the first-group delay tolerance corresponding to the first-type group Gm1' is also 100 ms, the base station eNB can select the user device 6 from the second-type group Gl3' and the user device 1 from the first-type group Gm1' to from a target group Gk2, as shown in FIG. 6.

Afterwards, in sub-step S3041 of step S304, the base station eNB determines whether the sum of the normalized channel-usage demand values of the user devices in any one of the target groups is larger than 1, and in sub-step S3042, when the sum of the normalized channel-usage demand values of the user devices in any one of the target groups is larger than 1, the base station eNB splits this target group.

Explained by the target group Gk1 in the embodiment of FIG. 6, the normalized channel-usage demand R2 of the user device 2 is assumed to be 0.2, the normalized channel-usage demand R3 of the user device 3 is 0.3, the normalized channel-usage demand R8 of the user device 8 is 0.7. In this case, the base station eNB determines that the sum of the normalized channel-usage demand values of the user devices in the target group Gk1 is larger than 1, so that it should split this target group Gk1. The aforementioned normalized channel-usage demand value can be calculated by $\Sigma_{p=1}^{p=P} R_{p,i}$.

In an embodiment, the split performed on this target group by the base station eNB comprises by the base station eNB, selecting the user device having the maximum normalized channel-usage demand value from the target group to form another group other than the target groups. Explained by the aforementioned example, since the user device 8 has the maximum channel-usage demand value, the base station eNB selects the user device 8 to be out of the target group Gk1 to form another target group Gk3 (not shown in the figure). The aforementioned splitting method of the target group is merely illustrative and the invention is not limited thereto. In practice, after completing sub-step S3042, the sub-step S3041 is repeated to perform the determining until the sum of the normalized channel-usage demand values of the user devices in every target group is less than 1. In other words, when the base station eNB determines that the sum of the normalized channel-usage demand values of the internal user devices in every target group is less or equal to 1, this grouping method is ended.

In practice, after completing the aforementioned grouping of the target groups, the base station eNB can further assign different physical uplink control channel resources to different target groups, and perform allocation of channel-state report resources on the user devices in the same target group. In the following, the allocation of channel-state report resources for the user devices in a single target group is described.

In an embodiment, the grouping method provided in this invention further comprises: by the base station eNB, respectively sending radio resource control (RRC) configuration messages to the user devices in one of the target groups. The RRC configuration message comprises a periodic channel-state information report parameter and a discontinuous reception parameter, wherein the periodic channel-state information report parameter comprises a report period, a report time offset and physical uplink control channel (PUCCH) resource information; when the base station eNB predicts that conflicting user devices in the user devices in the target group are going to simultaneously perform channel-state information reporting according to the operational states of the user devices, the base station eNB decides one of the conflicting user devices to perform the channel-state information reporting, and sends a sleep instruction to other conflicting user devices other than the conflicting user device which is allowed to perform the channel-state information reporting. The RRC configuration messages which are sent to the user devices comprise the identical report period, the identical report time offset and the identical PUCCH source information. The sleep instruction can be a discontinuous receiving command media access control layer control unit (DRX Command of MAC CONTROL ELEMENT, DRX CE), but is not limited to this.

Figure 7A:
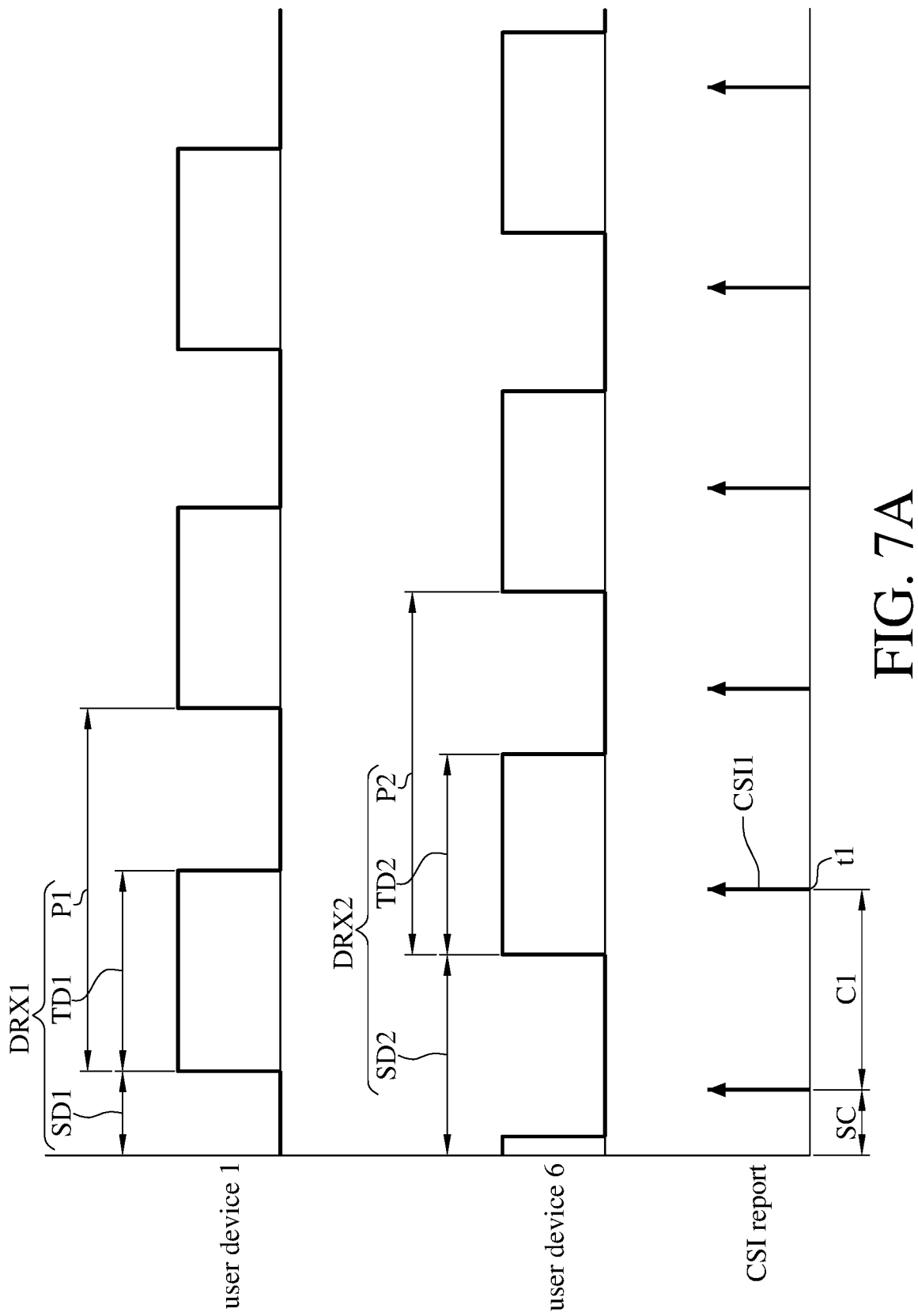
FIG. 7A is an initial setting waveform diagram of the user devices according to an embodiment of this invention.
Figure 7B:
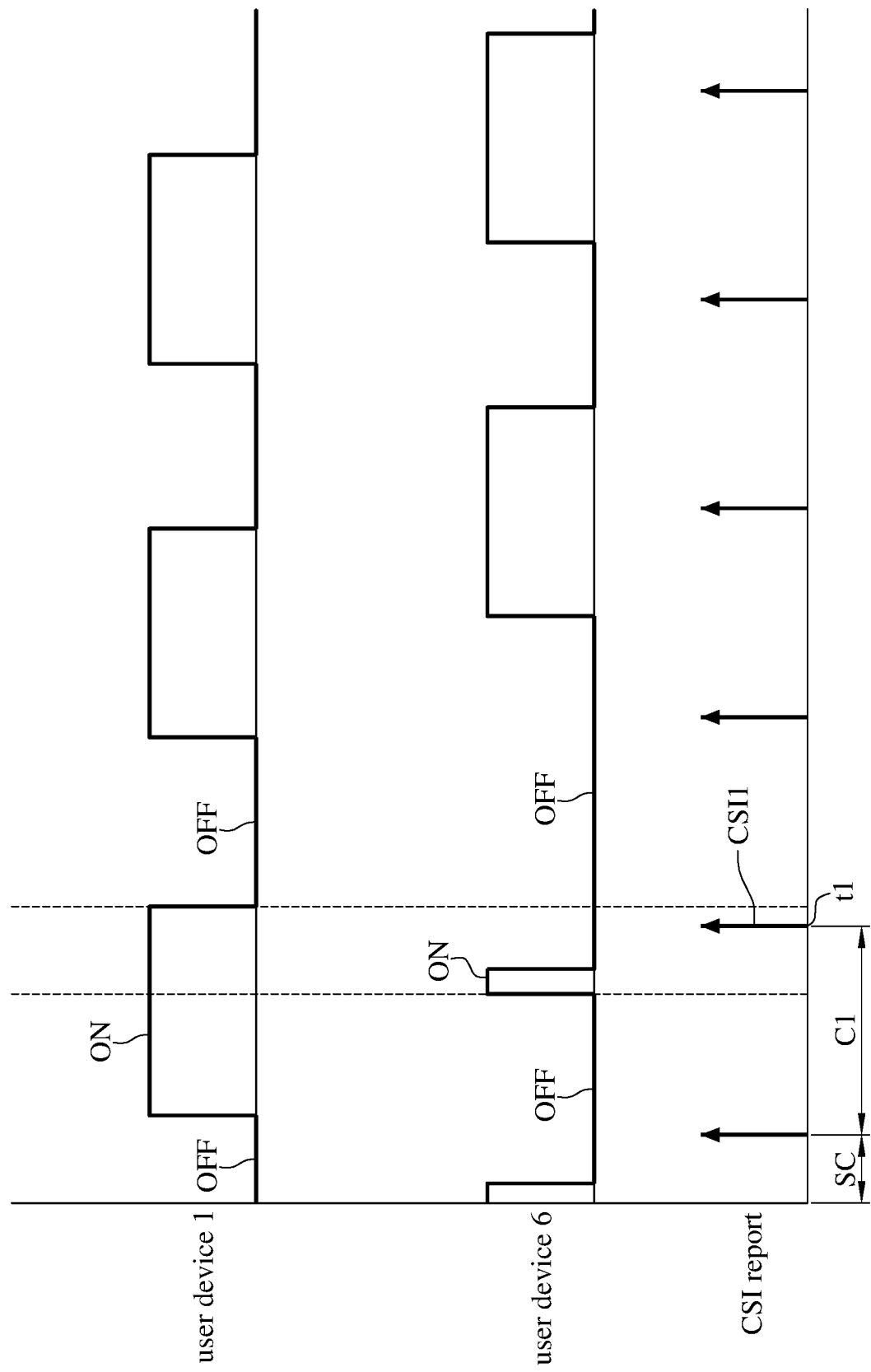
FIG. 7B is an actual operating waveform diagram of the user devices according to an embodiment of this invention.

Using the target group GK2 as a practical example to illustrate the above embodiment, please refer to FIG. 1, FIG. 6, FIG. 7A and FIG. 7B, wherein FIG. 7A is an initial setting waveform diagram of the user devices according to an embodiment of this invention, and FIG. 7B is an actual operating waveform diagram of the user devices according to an embodiment of this invention. The base station eNB respectively sends the radio resource control (RRC) configuration messages to the user device 1 and the user device 6. As shown in the initial setting waveform diagram of FIG. 7A, the discontinuous reception parameter DRX1 configured to the user device 1 comprises a discontinuous reception period P1, a wake-up time shift SD1 and wake-up duration TD1, and the discontinuous reception parameter DRX2 configured to the user device 6 comprises a discontinuous reception period P2, a wake-up time shift SD2 and wake-up duration TD2.

The wake-up duration and sleep duration are repeatedly presented in a periodic manner and staggered to form a power-saving mechanism of discontinuous reception. In this embodiments, the user device 1 and the user device 6 are configured with the identical report period (e.g. C1 shown in FIG. 7A), the identical report time offset (e.g. SC shown in FIG. 7A) and the identical PUCCH resource (e.g. CSI1 shown in FIG. 7A). After completing the aforementioned parameter configuration of the user device 1 and the user device 6, the base station eNB further predicts that the user device 1 and the user device 6 in the target group Gk2 are going to simultaneously perform channel-state information reporting according to the operational states of the user device 1 and the user device 6. At this moment, the base station eNB determines that the user device 1 and the user device 6 are conflicting user devices.

More particularly, as shown in the actual operating waveform diagram of FIG. 7B, since during the state information report time t1, the user device 1 and the user device 6 are both in an active state ON, the base station eNB determines that a channel-state information reporting conflict will occur between the user device 1 and the user device 6; thus, the base station eNB can decide one of the two user devices to perform the channel-state information reporting according to data transmission states of the user device 1 and the user device 6, and the other one of the two user devices receives a sleep instruction from the base station eNB so as to enter an inactive state OFF. The sleep instruction can be a discontinuous receiving command media access control layer control unit (DRX Command of MAC CONTROL ELEMENT, DRX CE), but is not limited to this.

In the embodiment of FIG. 7B, if the user device 1 will perform data transmission but the user device 6 would not perform data transmission, the base station eNB decides the user device 1 to perform channel-state information reporting, and sends a sleep instruction to the user device 6 to force it into a dormant state (i.e. inactive state OFF). By the aforementioned method, the channel-state information reporting conflict between the user device 1 and the user device 6 may be avoided, so that the PUCCH resource sharing between different user devices in the same target group may be achieved. The sleep instruction can be a discontinuous receiving command media access control layer control unit (DRX Command of MAC CONTROL ELEMENT, DRX CE), but is not limited to this.

The aforementioned embodiments of FIG. 7A and FIG. 7B mainly uses the sleep instruction sent by the base station eNB to force the user device which does not perform data transmission into the dormant state, so as to dynamically allocate the physical uplink control channel resources to the user devices for periodic channel-state information reporting, in order to improve the usage efficiency of the physical uplink control channel resources and further reduce the overall demand for the physical uplink control channel resources. In another embodiment, the above purpose may be achieved by configuring a discontinuous reception period and a state information report period which have a specific period length relationship, which will be described in details below. The sleep instruction can be a discontinuous receiving command media access control layer control unit (DRX Command of MAC CONTROL ELEMENT, DRX CE), but is not limited to this.

In an embodiment, the grouping method provided in this invention further comprises: by the base station eNB, performing a scheduling algorithm to obtain a report period, a report time offset and the discontinuous reception period corresponding to each of the user devices in one of the target groups, the wake-up time shift corresponding to each of the user devices and the wake-up duration corresponding to each of the user devices, so as to make a wake-up time of each of the user devices not overlap with a channel report time; by the base station eNB, respectively sending radio resource control (RRC) configuration messages to the user devices. The RRC configuration message comprises a report period, a report time offset, physical uplink control channel (PUCCH) source information, the discontinuous reception period corresponding to the user device which receives this RRC configuration message, the wake-up time shift corresponding to the user device which receives this RRC configuration message, and the wake-up duration corresponding to the user device which receives this RRC configuration message. The RRC configuration messages which are sent to the user devices have the identical report period, the identical channel report time and the identical PUCCH resource information.

Figure 8A:
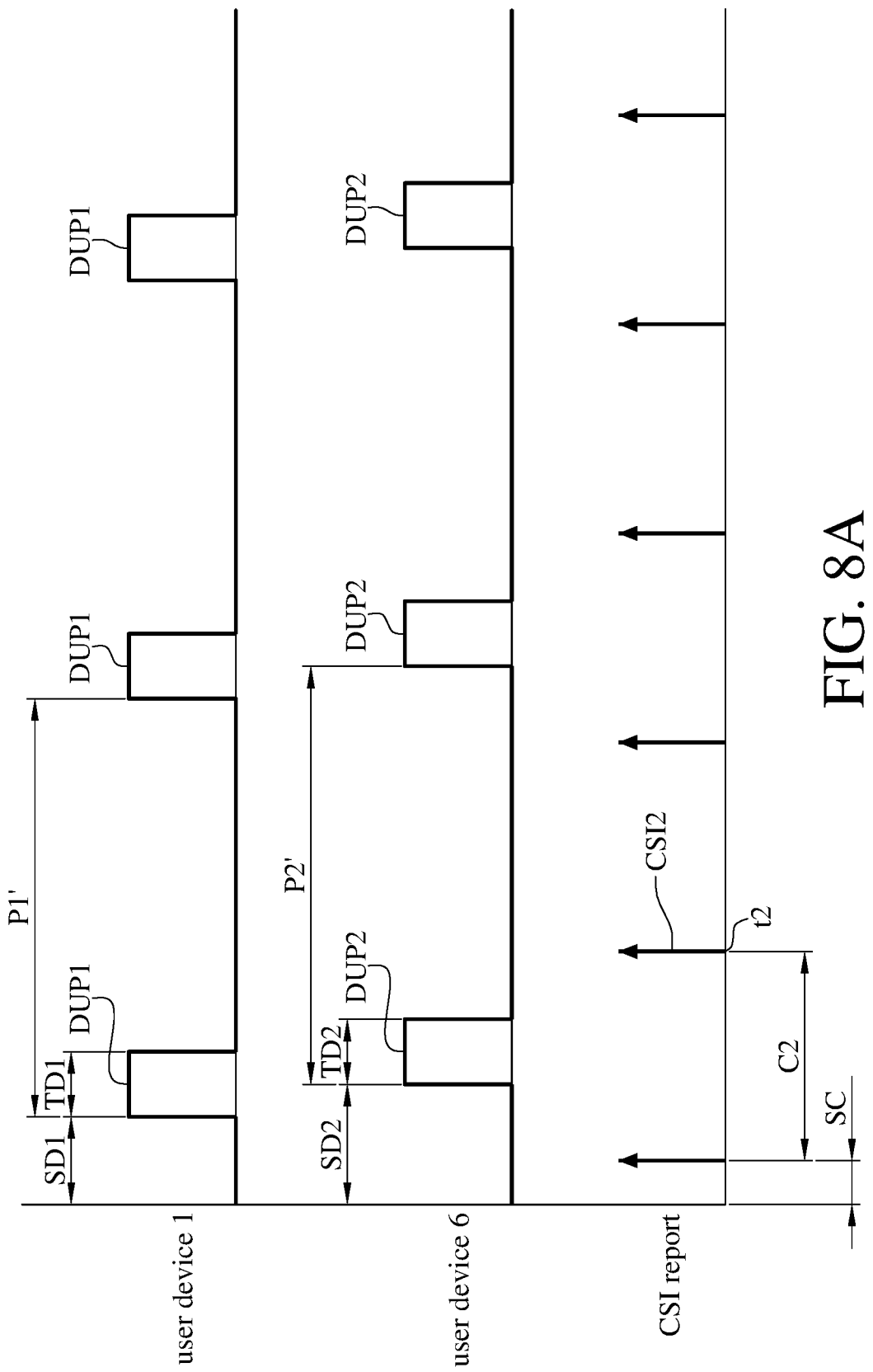
FIG. 8A is an initial setting waveform diagram of the user devices according to another embodiment of this invention.
Figure 8B:
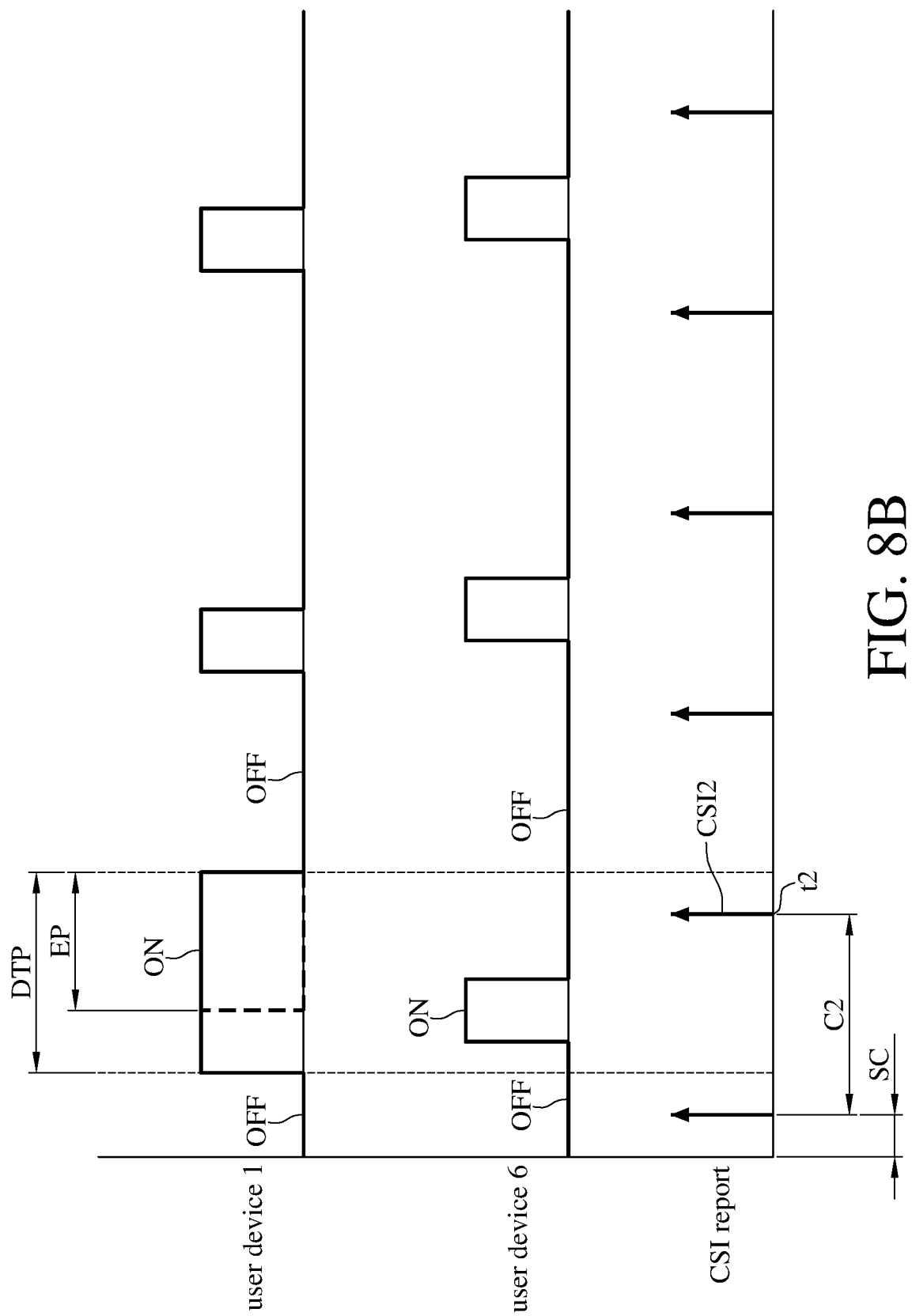
FIG. 8B is an actual operating waveform diagram of the user devices according to another embodiment of this invention.

In the following, the target group GK2 is similarly used as a practical example to illustrate the above embodiment. Please refer to FIG. 1, FIG. 5, FIG. 8A and FIG. 8B, wherein FIG. 8A is an initial setting waveform diagram of the user devices according to another embodiment of this invention, and FIG. 8B is an actual operating waveform diagram of the user devices according to another embodiment of this invention. As shown in FIG. 8A, the processor in the base station eNB (not shown in the figure) firstly performs a scheduling algorithm to obtain a state information report period C2, a report time offset SC, the discontinuous reception periods P1' and P2', the wake-up time shifts SD1, SD2 and the wake-up duration TD1 and TD2 corresponding to the user device 1 and the user device 6.

After obtaining the above parameters, the processor in the base station eNB further sends RRC configuration messages respectively to the user device 1 and the user device 6. The RRC configuration message comprises a state information report period C2, a report time offset SC and PUCCH resource (e.g. CSI2 shown in FIG. 8A) information. The RRC configuration message further comprises the discontinuous reception periods P1' and P2' corresponding to the user device 1 and the user device 6, and the wake-up time shift SD1, SD2 and the wake-up duration TD1, TD2 corresponding to the user device 1 and the user device 6.

In this embodiments, the discontinuous reception periods P1' and P2' are set as twice of the state information report period C2; however, the multiple described herein is merely illustrative and this invention is not limited thereto. In this embodiments, the user device 1 and the user device 6 are configured to have the identical report period C2, the identical report time (e.g. t2) and the identical PUCCH resource CSI2.

More particularly, a processor in the base station eNB can be configured to decide one of the user device 1 and the user device 6 to perform data transmission in the data transmission duration DTP (comprising the wake-up duration TD1 and the extended time interval EP shown in FIG. 8B, for example). When the state information report time of the user device performing data transmission is located in the data transmission duration DTP, the user device performing the data transmission performs channel-state information reporting, and other user devices except the user device performing the data transmission do not perform the channel-state information reporting. The data transmission duration DTP is associated with the wake-up duration TD1. The wake-up duration TD1 and TD2 can be used to decide the wake-up times DUP1, DUP2 of the user devices 1, 6. The wake-up times DUP1, DUP2 and the state information report time (e.g. t2) are staggered (i.e. no overlap therebetween).

In the actual operating waveform diagram of FIG. 8B, if the base station eNB decides the first user device 1 to perform data transmission in the data transmission duration DTP and the state information report time t2 is located in the data transmission duration DTP, the user device 1 uses the physical uplink control channel resource CSI2 to perform channel-state information reporting. In this case, the second user device 6 does not perform the channel-state information reporting. The state information report time t2 is decided by the report period C2 and the report time offset SC, and the data transmission duration DTP is associated with the discontinuous reception period P1', the wake-up time shift SD1 and the wake-up duration TD1. In the actual operating example, as shown in FIGS. 8A and 8B, the base station eNB is configured to extend the wake-up duration TD1 by a time interval EP to generate the data transmission duration DTP. In other words, when the user device 1 transmits data in the wake-up duration TD1, since the wake-up duration TD1 is insufficient, the base station eNB can extend the wake-up duration TD1 by a time interval EP to allow the user device 1 to continue to transmit data until the transmission is completed.

In view of the above description, the grouping method of user devices provided in this invention, mainly by the base station, performs the initial grouping on the user devices according to the maximum delay tolerances and the minimum delay tolerances firstly, and then removes part of the user devices from the corresponding type group according to the channel-usage demand of the user devices. Afterwards, the user devices having the identical group delay tolerance in these type groups are selected to form a target group. Finally, the sum of the normalized channel-usage demand values of the target group is determined to decide whether to further split this target group. Thereby, the user devices can be appropriately classified into different groups, so that the base station may individually allocate parameters for these user devices in a single group to improve the channel resource usage efficiency of the user devices in a single group.

What is claimed is:

1. A grouping method, applied to user devices connected to a base station, comprising:
by the base station, configuring one or more codes for each of the user devices, wherein each of said one or more codes corresponds to a delay tolerance;
by the base station, performing a grouping task according to the delay tolerances and a determining result of channel-usage demand corresponding to each of the user devices, so as to form one or more first-type groups and one or more second-type groups, wherein each of said one or more first-type groups corresponds to a first-group delay tolerance, and each of said one or more second-type groups corresponds to a second-group delay tolerance; and
by the base station, performing a selection from user devices in the one or more first-type groups and the one or more second-type groups to form one or more target groups according to the first-group delay tolerances and the second-group delay tolerances,
wherein the delay tolerances of the one or more first-type groups and the one or more second-type groups are different;
wherein by the base station, performing the grouping task according to the delay tolerances and the determining result of the channel-usage demand corresponding to each of the user devices, so as to form said one or more first-type groups and said one or more second-type groups comprising:
by the base station, dividing the user devices into one or more initial first-type group and one or more initial second-type group according to the delay tolerances;
by the base station, determining whether each of the user devices in each of the initial second-type groups has the channel-usage demand to selectively remove at least one of the user devices from the initial second-type group so as to form said one or more second-type groups; and
by the base station, determining whether each of the user devices in each of the initial first-type groups has the channel-usage demand to selectively remove at least one of the user devices from the initial first-type group so as to form said one or more first-type groups.

2. The grouping method according to claim 1, further comprising:
by the base station, determining whether to split at least one of the target groups according to a sum of normalized channel-usage demand values of user devices in each of the target groups.

3. The grouping method according to claim 2, wherein by the base station, determining whether to split said at least one of the target groups according to the sum of the normalized channel-usage demand values of the user devices in each of the target groups comprising:
by the base station, determining whether the sum of the normalized channel-usage demand values of the user devices in any one of the target groups is larger than 1; and
when the sum of the normalized channel-usage demand values of the user devices in any one of the target groups is larger than 1, splitting the target group by the base station.

4. The grouping method according to claim 3, wherein splitting the target group by the station comprises:
by the base station, selecting a user device having a maximum normalized channel-usage demand value in the target group to form another target group other than the target groups.

5. The grouping method according to claim 1, wherein the base station configures said one or more codes of each of the user devices according to service types of the user devices.

6. The grouping method according to claim 1, wherein by the base station, dividing the user devices into said one or more initial first-type groups and said one or more initial second-type groups comprising:
- by the base station, selecting user devices having identical minimum delay tolerance from the user devices to form said one or more initial first-type groups;
- by the base station, selecting user devices having identical maximum delay tolerance from the user devices to form said one or more initial second-type groups.

7. The grouping method according to claim 1, wherein by the base station, determining whether each of the user devices in each of the initial second-type groups has the channel-usage demand to selectively remove said at least one of the user devices from the initial second-type group so as to form said one or more second-type groups comprising:
- when the base station determines that at least one of the user devices in one of the initial second-type groups has the channel-usage demand, the base station removes the user device from the initial second-type group.

8. The grouping method according to claim 1, wherein by the base station, determining whether each of the user devices in each of the initial first-type groups has the channel-usage demand to selectively remove said at least one of the user devices from the initial first-type group so as to form said one or more first-type groups comprising:
- when the base station determines that at least one of the user devices in one of the initial first-type groups does not have the channel-usage demand, the base station removes the user device from the initial first-type group.

9. The grouping method according to claim 1, wherein by the base station, forming said one or more target groups according to the first-group delay tolerances and the second-group delay tolerances comprising:
- when the base station determines that one of the first-group delay tolerances is identical to one of the second-group delay tolerances, selecting the user devices in the first-type group corresponding to the first-group delay tolerance and the user devices in the second-type group corresponding to the second-group delay tolerance to form the target group.

10. The grouping method according to claim 1, wherein by the base station, performing the grouping task according to the delay tolerances and the determining result of the channel-usage demand corresponding to each of the user devices, so as to form said one or more first-type groups and said one or more second-type groups comprising:
- by the base station, determining whether each of the user devices has the channel-usage demand;
- by the base station, dividing the user devices into one or more initial first-type groups and one or more initial second-type groups according to the delay tolerances;
- by the base station, removing a user device not having the channel-usage demand from the initial first-type group to from said one or more first-type groups; and
- by the base station, removing a user device having the channel-usage demand from the initial second-type group to form said one or more second-type group.

* * * * *